(12) United States Patent
Musch et al.

(10) Patent No.: US 8,519,047 B2
(45) Date of Patent: Aug. 27, 2013

(54) AQUEOUS ADHESIVE DISPERSIONS

(75) Inventors: Rüdiger Musch, Bergisch Gladbach (DE); Christiane Oppenheimer-Stix, Neuss (DE); Knut Panskus, Leverkusen (DE); Renke Mottweiler, Leverkusen (DE); Norbert Schildan, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 327 days.

(21) Appl. No.: 10/825,934

(22) Filed: Apr. 16, 2004

(65) Prior Publication Data

US 2005/0143498 A1   Jun. 30, 2005

(30) Foreign Application Priority Data

Apr. 22, 2003 (DE) ................................. 103 18 107

(51) Int. Cl.
*B03D 1/016* (2006.01)

(52) U.S. Cl.
USPC ............ 524/551; 524/552; 524/425; 524/447; 524/567

(58) Field of Classification Search
USPC .................... 524/425, 447, 551, 567, 552
See application file for complete search history.

(56) References Cited

U.S. PATENT DOCUMENTS

| | | | | |
|---|---|---|---|---|
| 2,234,215 A | | 3/1941 | Youker | 260/89 |
| 2,321,693 A | | 6/1943 | Melsenburq et at | 260/92.7 |
| 2,405,724 A | * | 8/1946 | Wilder | 524/28 |
| 2,567,117 A | | 9/1951 | Mochel | 260/92.3 |
| 3,397,173 A | | 8/1968 | Collette et al. | 260/45.9 |
| 3,422,045 A | | 1/1969 | Aho | 260/27 |
| 3,639,301 A | | 2/1972 | Youker | 260/2.5 L |
| 3,875,201 A | | 4/1975 | Mayer-Mader et al. | 260/455 B |
| 3,920,623 A | | 11/1975 | Khan | 260/92.3 |
| 3,926,912 A | | 12/1975 | Mayer-Mader et al. | 260/92.3 |
| 3,929,752 A | | 12/1975 | Cooper et al. | 260/92.3 |
| 3,932,355 A | | 1/1976 | Barney et al. | 260/63 HA |
| 3,954,916 A | | 5/1976 | Mayer-Mader et al. | 260/888 |
| 3,984,384 A | | 10/1976 | Mayer-Mader et al. | 526/223 |
| 4,000,222 A | | 12/1976 | Mayer-Mader et al. | 260/890 |
| 4,016,177 A | | 4/1977 | Mayer-Mader et al. | 260/340.7 |
| 4,032,541 A | | 6/1977 | Mayer-Mader et al. | 260/340.9 |
| 4,124,754 A | | 11/1978 | Miller | 526/220 |
| 4,141,875 A | | 2/1979 | Brizzolara et al. | 260/29.7 E |
| 4,521,576 A | | 6/1985 | Musch et al. | 526/213 |
| 4,528,388 A | | 7/1985 | Arend et al. | 549/448 |
| 4,704,441 A | | 11/1987 | Musch | 526/220 |
| 4,954,408 A | | 9/1990 | Georges | 430/108 |
| 5,773,544 A | | 6/1998 | Christell et al. | 526/223 |
| RE36,618 E | * | 3/2000 | Christell et al. | 524/273 |
| 6,087,439 A | | 7/2000 | Ganster et al. | 524/591 |
| 6,525,132 B1 | | 2/2003 | Oba et al. | 524/764 |
| 6,767,947 B2 | | 7/2004 | Musch et al. | 524/273 |
| 2002/0120045 A1 | | 8/2002 | Musch et al. | 524/285 |

FOREIGN PATENT DOCUMENTS

| | | | |
|---|---|---|---|
| DE | 1186215 | | 1/1965 |
| EP | 451998 A2 | * | 10/1991 |
| GB | 512458 | | 9/1939 |
| GB | 952156 | | 3/1964 |
| GB | 1048235 | | 11/1966 |
| GB | 1318980 | | 5/1973 |
| JP | 48-9468 | | 3/1973 |
| JP | 60-31510 | | 2/1985 |
| JP | 2001-49043 | | 2/2001 |
| JP | 2001049043 A | * | 2/2001 |
| JP | 2003-055409 | | 2/2003 |

OTHER PUBLICATIONS

Ullmanns Encyklopädie der technischen Chemie, vol. 9, (month unavailable) 1957, pp. 366-367, "Kautschuk".
Encyclopedia of Polymer Science and Technology, vol. 3, (month unavailable) 1964, pp. 705-730, C.A. Hargreaves, II, and D.C. Thompson, "2-Chlorobutadiene Polymers".
Methoden Der Organischen Chemie, (Houben-Weyl), XIV/1, (month unavailable) 1961, pp. 738-752, H. Logemann, "Polymerisation der wichtigsten Monomeren".
Houben-Weyl, Methoden der Organischen Chemie, vol. E20, part 3, Makromolekulare Stoffe, (month unavailable) 1987, p. 845-852, W. Obrecht, "Polymerisation von 2-Chlor-1,3-butadien (Chloropren)".
Neoprene Latex, J.C. Carl, E.I. Du Pont De Nemours & Co. (Inc.) (month unavailable) 1964, pp. 13-14, Concentrating by Creaming.
Klebharze, R. Jordan & R. Hinterwaldner editiors, (month unavailable) 1994, pp. 75-115, Otmar Ackermann, "Harzdispersionen".
Handbook of Adhesives, second edition, (month unavailable) 1977, Chapter 21, pp. 343-367, Murray Steinfind, "Neoprene Adhesives: Solvent and Latex".
Translation of Japanese Search Report related to Application No. 2004-126783 (redacted).

* cited by examiner

*Primary Examiner* — Peter D Mulcahy
(74) *Attorney, Agent, or Firm* — Nicanor A. Kohncke

(57) ABSTRACT

Aqueous polymer dispersions based on polychloroprene, a process for their preparation and their use in adhesive formulations. The aqueous polymer dispersion is obtained by
  a) preparing an aqueous polychloroprene dispersion with a gel content of 0.1 wt. %-30 wt. %, based on the polymer, prepared by polymerization at 0° C.-70° C. of chloroprene and, optionally, ethylenically unsaturated monomers which can be copolymerized with chloroprene and
  b) subsequently storing the dispersion at temperatures of from 50° C.-110° C. until the gel content has risen by at least 10 wt. % to 1-60 wt. %, based on the polymer.

6 Claims, 1 Drawing Sheet

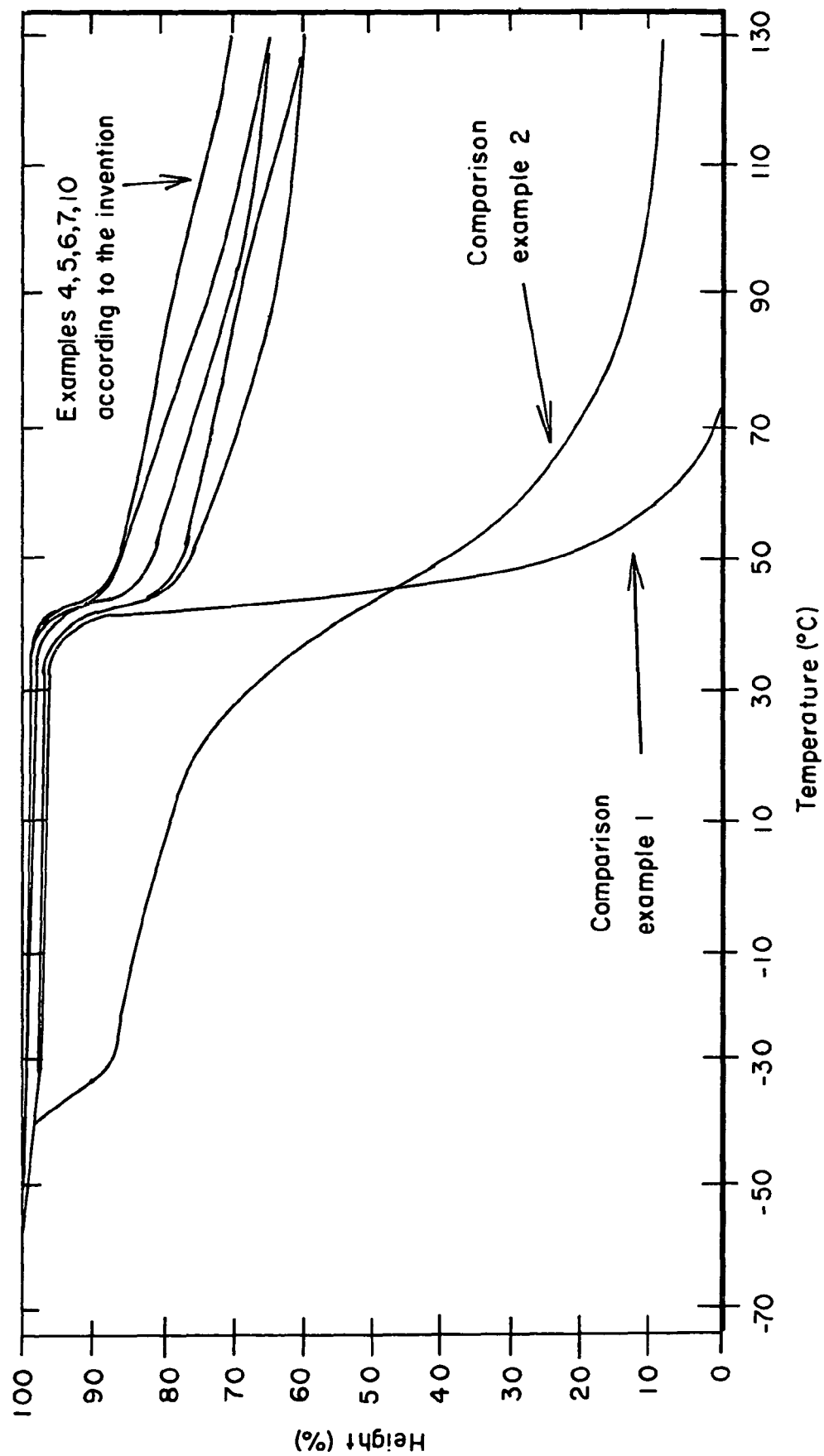

AQUEOUS ADHESIVE DISPERSIONS

CROSS REFERENCE TO RELATED PATENT APPLICATION

The present patent application claims the right of priority under 35 U.S.C. §119 (a)-(d) of German Patent Application No. 103 18 107.5, filed Apr. 22, 2003.

FIELD OF THE INVENTION

The invention relates to polychloroprene dispersions with improved storage stability and adhesive properties, a process for their preparation and their use as contact adhesives for inorganic or organic substrates.

BACKGROUND OF THE INVENTION

The preparation of polychloroprene has been known for a long time and is carried out by emulsion polymerization in an alkaline aqueous medium, cf. "Ullmanns Encyclopädie der technischen Chemie", volume 9, p. 366, Verlag Urban und Schwarzenberg, Munich-Berlin 1957; "Encyclopedia of Polymer Science and Technology", vol. 3, p. 705-730, John Wiley, New York 1965; "Methoden der Organischen Chemie" (Houben-Weyl) XIV/1, 738 et seq. Georg Thieme Verlag Stuttgart 1961.

Possible emulsifiers are in principle all compounds and mixtures thereof which stabilize the emulsion adequately, such as e.g. the water-soluble salts, in particular the sodium, potassium and ammonium salts, of long-chain fatty acids, colophony and colophony derivatives, higher molecular weight alcohol sulfates, arylsulfonic acids, formaldehyde condensates of arylsulfonic acids, nonionic emulsifiers based on polyethylene oxide and polypropylene oxide and polymers which have an emulsifying action, such as polyvinyl alcohol (DE-A 2 307 811, DE-A 2 426 012, DE-A 2 514 666, DE-A 2 527 320, DE-A 2 755 074, DE-A 3 246 748, DE-A 1 271 405, DE-A 1 301 502, U.S. Pat. No. 2,234,215, JP-A 60-031 510.

Polychloroprene is either used for the production of industrial rubber articles, after appropriate compounding and vulcanization, or it is employed as a contact adhesive raw material (Handbook of Adhesives; chapter 21, Verlag Van Nostrand Reinhold, New York, 2nd edition 1977).

Contact adhesives based on polychloroprene are predominantly solvent-containing adhesives which are applied to both components to be joined and are allowed to dry. By subsequent joining of the two components under pressure, a bond of high strength at room temperature and, after addition of appropriate high-melting resins, also at higher temperatures (heat resistance) is obtained.

For ecological and economic reasons there is a growing demand for suitable aqueous polychloroprene dispersions which can be processed to corresponding aqueous adhesive formulations. A disadvantage here is, however, that during storage the pH of these alkaline dispersions already decreases after a short storage time, even at room temperature. This undesirable effect is accelerated at higher storage temperatures. Dispatch and storage at the customer's premises can therefore take place only in thermo-containers. Adhesive formulations prepared from these dispersions also show this change in pH during storage and must be buffered accordingly.

The addition of high-melting resins, such as e.g. magnesium chelate complexes of alkylphenol resins—which significantly increase the heat resistance of the gluings of solvent-containing adhesives—is not possible in the field of formulations of polychloroprene dispersions. The production of gluings with a high heat resistance by addition of polyisocyanates to the adhesive formulation—a method which has been known for a long time for solvent-containing polychloroprene adhesives—leads to only a moderate increase in the heat resistance of formulations based on aqueous polychloroprene dispersions, since the polyisocyanate dispersion reacts chiefly with the water molecules to give urea, and to only a small extent with the few reactive groups in the polychloroprene.

The object was therefore to provide an aqueous polychloroprene dispersion which is distinguished by a long storage stability, i.e. of which the pH does not change significantly during the storage time, which in adhesive formulations achieves a gluing of high initial strength and high heat resistance—preferably without the addition of a high-melting resin—and which has a significantly higher reactivity towards polyisocyanate dispersions.

The conditioning of polychloroprene dispersions with a high solids content is known from the prior art. EP-A 0 857 741 reports that a product with a good reactivity towards dispersed polyisocyanates is obtained by storage of the dispersion at 50° C. A disadvantage which manifests itself here is that the pH of the dispersion is lowered significantly and the electrolyte content increased significantly by this operation. Both these circumstances lower the stability during storage and during formulation to give adhesives.

The preparation of crosslinked (gel-containing) polychloroprene dispersions is furthermore known. This polymerization is described in U.S. Pat. No. 5,773,544. By a polymerization up to a high monomer conversion, gel-containing polymer dispersions which are distinguished in adhesive formulations by their high heat resistance are obtained. A disadvantage which manifests itself here also is the low storage stability of the dispersions.

SUMMARY OF THE INVENTION

The present invention is directed to an aqueous polymer dispersion obtained by
a) preparing an aqueous polychloroprene dispersion with a gel content of 0.1 wt. %-30 wt. %, based on the polymer, prepared by polymerization at 0° C.-70° C. of chloroprene and, optionally, ethylenically unsaturated monomers which can be copolymerized with chloroprene and
b) subsequently storing the dispersion at temperatures of from 50° C.-110° C. until the gel content has risen by at least 10 wt. % to 1-60 wt. %, based on the polymer.

The present invention is also directed to a method of preparing adhesive formulations including adding one or more auxiliaries and/or additives selected from fillers, wetting agents, zinc oxide, organic thickeners, inorganic thickeners, fungicides, tackifying resins, and organic solvents to the above-described polymer dispersion.

The present invention is futher directed to adhesive formulations that include the above-described aqueous polymer dispersion.

DESCRIPTION OF THE DRAWINGS

FIG. 1 Shows the penetration depth in a TMA measurement as a function of temperature.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The object of the invention was achieved by providing an aqueous polychloroprene dispersion which is obtainable by continuous or discontinuous polymerization of chloroprene in aqueous emulsion, without or with addition of only a small amount of a regulator, optionally removal of the residual monomers and storage under certain conditions, wherein the desired polymer structure can be established in a targeted manner with an increase in the gel contents. This aqueous adhesive raw material dispersion can than be processed to an adhesive composition with those adhesive auxiliaries and additives known in the prior art.

The invention therefore provides an aqueous polymer dispersion obtainable by a) preparation of an aqueous polychloroprene dispersion with a content which is insoluble in organic solvents (gel content) of 0.1 wt. %-30 wt. %, based on the polymer, prepared by polymerization at 0° C.-70° C. of chloroprene and, optionally, ethylenically unsaturated monomers which can be copolymerized with chloroprene and b) subsequent storage at temperatures of 50° C.-110° C. until the gel content has risen by at least 10% to 1-60 wt. %, based on the polymer.

Suitable copolymerizable monomers are described e.g. in "Methoden der Organischen Chemie" (Houben-Weyl) XIV/1, 738 et seq. Georg Thieme Verlag Stuttgart 1961. Compounds having 3 to 12 C atoms and 1 or 2 copolymerizable C=C double bonds per molecule are preferred. Examples of preferred copolymerizable monomers are 2,3-dichlorobutadiene and 1-chlorobutadiene.

The polychloroprene dispersion to be employed in the process according to the invention is prepared by emulsion polymerization at 0 to 70° C., preferably at 5 to 45° C., and pH values of 10 to 14, preferably pH 11 to pH 13. The activation is carried out by the conventional activators and activator systems.

The polychloroprene dispersion preferably has a particle diameter of 60 to 120 mm.

Examples which may be mentioned of activators and activator systems are: formamidinesulfinic acid, potassium peroxodisulfate, redox systems based on potassium peroxodisulfate and optionally silver salt (Na salt of anthraquinone-β-sulfonic acid), where, for example, compounds such as formamidinesulfinic acid, the Na salt of hydroxymethanesulfinic acid, sodium sulfite and sodium dithionite serve as the redox partner. Redox systems based on peroxides and hydroperoxides are also suitable. The preparation of the polychloroprenes according to the invention can be carried out both continuously and discontinuously, the continuous polymerization being preferred.

To adjust the viscosity of the polychloroprenes according to the invention, it is possible to use conventional chain transfer agents, such as mercaptans, such as are described e.g. in DE-A 3 002 711, GB-A 1 048 235, FR-A 2 073 106, or such as xanthogen disulfides, such as are described e.g. in DE-A 1 186 215, in DE-A 2 156 453, DE-A 2 306 610 and DE-A 3 044 811, in EP-A 0 053 319, in GB-A 512 458 and GB-A 952 156 and in U.S. Pat. No. 2,321,693 and U.S. Pat. No. 2,567,117. Particularly preferred chain transfer agents are n-dodecylmercaptan and the xanthogen disulfides used in DE-A 3 044 811, DE-A 2 306 610 and DE-A 2 156 453.

The polymerization is conventionally interrupted at 50%-95%, preferably at 60%-80% of the monomer conversion, it being possible to add as an inhibitor e.g. phenothiazine, tert-butylpyrocatechol or diethylhydroxylamine. In this free-radical emulsion polymerization, the monomer is incorporated into the growing polymer chain in various positions, thus e.g. at a polymerization temperature of 42° C. to the extent of 92.5% in the trans-1,4-position, to the extent of 5.2% in the cis-1,2-position, to the extent of 1.2% in the 1,2-position and to the extent of 1.1% in the 3,4-position (W. Obrecht in Houben-Weyl: Methoden der organischen Chemie vol. 20 part 3 Makromolekulare Stoffe, (1987) p. 845), the monomer incorporated into the 1,2-position containing a labile chlorine atom which can easily be split off. This is the active species via which the vulcanization with metal oxides proceeds.

After the polymerization, the residual chloroprene monomer is preferably removed, for example by a steam distillation. This is carried out as described e.g. in "W. Obrecht in Houben-Weyl: Methoden der organischen Chemie vol. 20 part 3 Makromolekulare Stoffe, (1987) p. 852".

The low-monomer polychloroprene dispersion prepared in this manner is then stored at higher temperatures. During this, some of the labile chlorine atoms are once split off and a polychloroprene network which does not dissolve in organic solvents (gel) is built up, the gel content increasing by at least 10%, preferably at least 20% and in particular at least 50%. It differs significantly from the crosslinked polychloroprene gel prepared by polymerization, see measurement method 4 (TMA measurement).

In a further step the solids content of the dispersion can be increased by a creaming process. This creaming is carried out e.g. by addition of alginates, as described in "Neoprene Latices, John C. Carl, E. I. Du Pont 1964, p. 13".

The present invention therefore also provides the preparation of a partly crosslinked polychloroprene dispersion by:

polymerization of chloroprene and 0 to 20 parts by wt., based on 100 parts by wt. of chloroprene, of ethylenically unsaturated monomers which can be copolymerized with chloroprene, in the presence of 0-1 mmol of a regulator, based on 100 g of monomer, preferably 0-0.25 mmol, at temperatures of 0° C.-70° C., preferably 5° C.-45° C., particularly preferably at 10° C.-25° C., in aqueous, preferably alkaline emulsion, the dispersion having a content which is insoluble in organic solvents of 0.1-30 wt. %, preferably 0.5-5 wt. %, based on the polymer, optionally removal of the residual, non-polymerized monomers, for example by steam distillation storage of the dispersion at temperatures of 50° C.-110° C., preferably 60° C.-100° C., particularly preferably 70° C.-90° C., the content which is insoluble in organic solvents (gel content) rising by at least 10% to 1 wt. %-60 wt. %, preferably up to 5 wt. %-30 wt. %, particularly preferably to 10-20 wt. % (this takes, for example, 3 hours to 14 days, depending on the system, and can be determined by orientating preliminary experiments)

optionally increasing of the solids content to 50-64 wt. %, preferably to 52-59 wt. %, by a creaming processes, as a result of which a dispersion with a very low salt content is formed, in particular a low content of chloride ions, which is particularly preferably less than 500 ppm.

The invention also provides adhesive formulations based on the polychloroprene dispersions according to the invention and processes for their preparation.

Preferred adhesive compositions in the form of a dispersion comprise 100 parts by wt. of a polychloroprene dispersion, 15 to 75 parts by wt. of an adhesive resin, 1 to 10 parts of a metal oxide, preferably zinc oxide, and optionally further auxiliary substances and additives.

The polychloroprene dispersions according to the invention can optionally also comprise other dispersions, such as e.g. polyacrylate, polyvinylidene chloride, polybutadiene, polyvinyl acetate or styrene-butadiene dispersions, in a content of up to 30 wt. %.

To prepare an adhesive composition according to the invention, polychloroprene dispersion(s) according to the invention are mixed with the conventional adhesive auxiliaries and additives.

The adhesive composition according to the invention is free from or low in organic solvents. In this connection, "low in" means a content of less than 30 wt. % of organic solvents, based on the finished adhesive.

In addition to the polychloroprene dispersion, the adhesive composition according to the invention optionally comprises further adhesive auxiliaries and additives. For example, fillers, such as quartz flour, quartz sand, highly disperse silica, barite, calcium carbonate, chalk, dolomite or talcum, optionally together with wetting agents, for example polyphosphates (such as sodium hexametaphosphate), naphthalenesulfonic acid, ammonium or sodium polyacrylate salts, can be added, the fillers in general being added in amounts of 10 to 60%, preferably 20 to 50 wt. %, based on the adhesive, and the wetting agents in general being added in amounts of 0.2 to 0.6 wt. %, based on the filler.

Zinc oxide has particular importance as an additive, as an acceptor for small amounts of hydrogen chloride which may be split off from the polymers.

Further suitable auxiliaries are, for example, organic thickeners to be employed in amounts of 0.01 to 1 wt. %, based on the adhesive, such as cellulose derivatives, alginates, starch, starch derivatives or polyacrylic acid, or inorganic thickeners to be employed in amounts of 0.05 to 5 wt. %, such as, for example, bentonites.

Fungicides can also be added to the adhesive composition according to the invention as a preservative. These are in general employed in amounts of 0.02 to 1 wt. %, based on the adhesive. Suitable fungicides are, for example, phenol and cresol derivatives or organotin compounds.

Tackifying resins, such as e.g. non-modified or modified natural resins, such as colophony ester, hydrocarbon resins or synthetic resins, such as phthalate resins, can also optionally be added to the adhesive composition in dispersed form, cf. "Klebharze" R. Jordan, R. Hinterwaldner, p. 75-115, Hinterwaldner Verlag Munich 1994. Alkylphenol resin dispersion with softening points above 110° C. is preferred.

Organic solvents, such as, for example, toluene, xylene, butyl acetate, methyl ethyl ketone, ethyl acetate, dioxane or mixtures thereof, or plasticizers, such as, for example, those based on adipate, phthalate or phosphate, can optionally be added to the polychloroprene dispersions.

The adhesives according to the invention can be used for gluing any desired substrates of the same or different nature, e.g. wood, paper, plastics, textiles, leather, rubber and inorganic materials, such as ceramic, stoneware or asbestos cement.

EXAMPLES

A1) Preparation of the Polychloroprene Dispersions

The polymerization is carried out by a continuous process such as is described in EP-A 0 032 977.

Example A

Comparison Example

The aqueous phase (W) and the monomer phase (M), in an always constant ratio via a measuring and regulating apparatus, and the activator phase (A) are introduced into the first reactor of a polymerization cascade comprising 7 identical reactors with a volume of 50 litres each. The average dwell time in each tank is 25 minutes. The reactors correspond to those described in DE-A 2 650 714 (data in parts by wt. per 100 parts by wt. of monomers employed).

| (M) = Monomer phase: | |
|---|---|
| Chloroprene | 100.0 parts by wt. |
| n-Dodecylmercaptan | 0.11 parts by wt. |
| Phenothiazine | 0.005 parts by wt. |

| (W) = Aqueous phase: | |
|---|---|
| Desalinated water | 115.0 parts by wt. |
| Sodium salt of a disproportionated abietic acid | 2.6 parts by wt. |
| Potassium hydroxide | 1.0 parts by wt. |

| (A) = Activator phase: | |
|---|---|
| 1% aqueous formamidinesulfinic acid solution | 0.05 parts by wt. |
| Potassium persulfate | 0.05 parts by wt. |
| Anthraquinone-2-sulfonic acid Na salt | 0.005 parts by wt. |

The reaction starts readily at an internal temperature of 15° C. The heat of polymerization released is removed and the polymerization temperature kept at 10° C. by external cooling. At a monomer conversion of 70% the reaction is interrupted by addition of diethylhydroxylamine. The residual monomer is removed from the polymer by steam distillation. The solids content is 33 wt. %, the gel content is 0 wt. % and the pH is 13.

After a polymerization time of 120 hours, the polymerization line is exited.

Example B

Comparison Example

The procedure is as in example A, but the regulator content is decreased to 0.03 wt. %, the monomer conversion is increased to 80% and the polymerization temperature is increased to 45° C. to produce a polymer with a high gel content.

The solids content is 38 wt. % and the gel content is 60 wt. %, the pH is 12.9.

Example C

Example According to the Invention

The procedure is as in example A, but polymerization is carried out up to a monomer conversion of 80% with 0.03% of the regulator n-dodecylmercaptan.

The solids content is 38 wt. % and the gel content is 4 wt. %, the pH is 12.8.

Example D

Example According to the Invention

The procedure is as in example C, but polymerization is carried out without the regulator n-dodecylmercaptan, but up to a monomer conversion of 70%.

The solids content is 33 wt. % and the gel content is 15 wt. %, the pH is 13.0.

Example E

Example According to the Invention

The procedure is as in example A, but the regulator content in the monomer phase is decreased to 0.03 wt. %.

The solids content is 33 wt. % and the gel content is 1.2 wt. %, the pH is 12.9.

Example F

Example According to the Invention

The procedure is as in example A, but the regulator content in the monomer phase is decreased to 0.04 wt. %.

The solids content is 33 wt. % and the gel content is 1 wt. %, the pH is 13.1.

A2) Conditioning of the Dispersions

After the steam distillation, the dispersions are conditioned in an insulated storage tank for 6 hours to 6 days at temperatures of between 60 and 90° C., the temperature being adjusted by an additional heating, if appropriate, and the increase in the gel content in the latex being measured with the aid of samples.

A3) Creaming Process

Solid alginate (Manutex) is dissolved in deionized water and a 2 wt. % alginate solution is prepared. 200 g portions of the polychloroprene dispersion are initially introduced into eight 250 ml glass bottles and in each case 6 to 20 g of the alginate solution—in 2 g steps—are stirred in. After a storage time of 24 hours the amount of serum formed above the thick latex is measured. The amount of alginate of the sample with the greatest serum formation is multiplied by 5 and gives the optimum amount of alginate for creaming of 1 kg of polychloroprene dispersion.

B) Measurement Methods

1. Determination of the Gel Content From the Dispersion

The polymer in the latex is extracted out of the dispersion by recrystallization. This is effected by mixing of the dispersion with toluene and acetic acid and addition of alkylenebenzyldimethylammonium chloride. The gel content contained in the polymer is separated off by centrifugation, dried and weighed.

2. Determination of the Peel Strength

Testing is carried out in accordance with EN 1392. A 100 μm thick wet film of the dispersion is applied to two test specimens of Nora rubber (styrene-butadiene rubber, SBR), roughened with emery paper (grain size=80) and aired for 1 hour at room temperature.

The test specimens are subsequently, according to:

Method A: shock-activated and joined together for 10 seconds with 4 bar or

Method B: joined together for 10 seconds with 4 bar without activation.

Tear testing is carried out on a commercially available tensile tester at room temperature. The strength values are determined immediately after the gluing and after one day.

Shock Activation

The adhesive surfaces are irradiated for 4 seconds with an IR lamp from Funk (Shock Activator 2000). Gluing takes place immediately after the thermal activation of the test specimens coated with adhesive, by placing the activated adhesive layers against each other and pressing them in a press. The test specimens produced in this way are stored at 23° C. and 50% relative atmospheric humidity.

3. Thermal Testing

The NORA test specimens are glued with an overlap of 2 cm$^2$, loaded with 4 kg and conditioned in a heating cabinet at 40° C. in the course of 30 min. The test specimens are then heated up to 150° C. with a linear heating up rate of 0.5° C./min. The softening temperature, i.e. the temperature in ° C. at which the gluing fails in the shear test under the 4 kg load, is recorded. In each case 5 individual measurements are carried out.

4. TMA Measurement

The dispersions are dried as a film, in particular for 3 days at room temperature, 1 hour at 80° C. and then once more for 3 days at room temperature, during which a film with a thickness of 1.0 mm to 1.5 mm should form. Measurement is carried out with an apparatus from Perkin Elmer, DMA 7, under a load of 500 mN over a temperature programme from −100° C. to +240° C., rate of increase 5°/min. The penetration depth of the measuring head at the corresponding temperature is measured.

C) Conditioning According to the Invention of a Polychloroprene Dispersion After the Polymerization TABLE 1a Influence of the conditioning on the gel content

| Disp. from ex. | Regulator (%) | Poly temp. (° C.) | Conversion (%) | Gel content (%) | Gel content in % after conditioning at 80° C. (time in days) | | | |
|---|---|---|---|---|---|---|---|---|
| | | | | | 1 d | 2 d | 3 d | 4 d |
| A | 0.11 | 10 | 70 | 0 | 0 | 0 | 0 | 1 |
| B | 0.03 | 45 | 80 | 60 | — | — | — | — |
| C*) | 0.03 | 10 | 80 | 4 | 7** | 12** | 22** | 28** |
| D*) | 0 | 10 | 70 | 15 | 30** | 47** | 82 | 90 |
| E*) | 0.03 | 10 | 71 | 1.2 | 8** | 10** | 16** | 20** |
| F*) | 0.04 | 10 | 70 | 1.0 | 4** | 6** | 9** | 12** |

*)example according to the invention
**gel content according to the invention

D) Increase in the Solids Content of the Dispersions by Creaming

TABLE 1b

All 6 dispersions are creamed in accordance with instructions A3, examples A, B and D without conditioning, examples D to F after conditioning

| | Example | | | | | | | | | |
|---|---|---|---|---|---|---|---|---|---|---|
| | 1 | 2 | 3*) | 4*) | 5*) | 6 | 7 | 8*) | 9*) | 10*) |
| Dispersion | A | B | D | | D | | | E | | F |
| Days cond. at 80° C. | 0 | 0 | 0 | 1 | 2 | 3 | 4 | 3 | 2 | 4 |
| Gel content % | 0 | 60 | 15 | 30 | 47 | 82 | 90 | 16 | 6 | 12 |

TABLE 1b-continued

All 6 dispersions are creamed in accordance with instructions A3, examples A, B and D without conditioning, examples D to F after conditioning

| | Example | | | | | | | | | |
|---|---|---|---|---|---|---|---|---|---|---|
| | 1 | 2 | 3*) | 4*) | 5*) | 6 | 7 | 8*) | 9*) | 10*) |
| Solids in % | 58 | 55 | 58 | 56 | 55 | 56 | 53 | 56 | 57 | 57 |
| pH | 12.9 | 12.8 | 12.8 | 12.9 | 12.8 | 12.7 | 12.7 | 12.7 | 12.8 | 12.8 |

FIG. 1 shows the softening properties of polychloroprene films (TMA measurement). As FIG. 1 shows, the increasing gel content in the comparison polymers leads to a slight improvement in the softening properties of example 1 (0 wt. % gel) over example 2 (60 wt. % gel).

The polymers according to the invention show significantly lower softening properties, regardless of the gel content, as is seen from the curves of examples 4, 5, 6, 7 and 10.

TABLE 2a

Influence of the storage temperature (days 7/60° C.) on the pH of the dispersions

| | Example | | | | | | | | | |
|---|---|---|---|---|---|---|---|---|---|---|
| | 1 | 2 | 3*) | 4*) | 5*) | 6 | 7 | 8*) | 9*) | 10*) |
| Dispersion | A | B | D | | D | | | E | | F |
| Days cond. at 80° C. | 0 | 0 | 0 | 1 | 2 | 3 | 4 | 3 | 2 | 4 |
| Gel content % | 0 | 60 | 15 | 30 | 47 | 82 | 90 | 16 | 6 | 12 |
| pH before storage | 12.9 | 12.8 | 12.8 | 12.9 | 12.8 | 12.7 | 12.7 | 12.7 | 12.8 | 12.8 |
| pH after storage | 9.1 | 9.8 | 9.6 | 12.5 | 12.6 | 12.5 | 12.5 | 12.4 | 12.6 | 12.6 |

As can be seen from Table 2a, all the conditioned dispersions (examples 4 to 10) are significantly more stable to storage, also at higher storage temperatures, after creaming compared with the non-conditioned comparison materials (examples 1 to 3), which can be seen by the fact that a drop in the pH scarcely no longer takes place after storage of the dispersions according to examples 4 to 10.

E) Preparation of an Adhesive Based on the Polychloroprene Dispersion According to the Invention

TABLE 2B

Preparation of the formulation for the comparison studies

| Product | Function | Addition as | Solids content (%) | Parts by weight |
|---|---|---|---|---|
| Polychloroprene dispersion | polymer | dispersion | 55-58 | 100 |
| Rhenofit ® DDA-EM 50 (1) | anti-ageing agent | dispersion | 50 | 2 |
| Baykanol ® PQ (2) | stabilizer | dispersion | 30 | 0.75 |
| Borchers 9802 (3) | ZnO | dispersion | 50 | 4 |
| Dermulsene ® TR 93 (4) | resin | dispersion | 50 | 30 |

Sources of Supply:
(1): Rhein Chemie GmbH, Mannheim, D (50% diphenylamine derivative in aqueous emulsion)
(2): Bayer AG, Leverkusen, D (sodium salt of a condensation product of naphthalene-sulfonic acid and formaldehyde)
(3): Borchers GmbH, Langenfeld, D (zinc oxide paste)
(4): DRT (Les Derives Resiniques+Terpeniques), Cedex, France (terpene-phenol resin dispersion)

For preparation of the formulation, the polychloroprene dispersion is initially introduced into a glass beaker. The stabilizer, the anti-ageing agent, ZnO and the resin are added, while stirring.

E1: Measurement of the Initial Peel Strength and Softening Point

Storage time after application of the adhesive 60 min, gluing with shock activation (method A), substrate: linen TABLE 2c

| | Example no. | | | | | | | | |
|---|---|---|---|---|---|---|---|---|---|
| | 1 | 9*) | 10*) | 3 | 8*) | 4*) | 5 | 6 | 7 |
| Gel content (%) | 0 | 6 | 12 | 15 | 16 | 30 | 47 | 82 | 90 |
| Initial strength (N/mm) | 2.6 | 2.6 | 2.8 | 2.1 | 2.0 | 1.6 | 1.6 | 1.4 | 1.0 |
| Soft point (° C.) | 52 | 77 | 95 | 116 | 128 | 135 | 106 | 98 | 92 |

*)example according to the invention

As Table 2c shows, the initial strength of the gluing reduces with increasing gel content of the dispersions, while the heat resistance (softening point) runs over a maximum.

There are 2 regions:

A) Here the gel content does not influence the adhesion. Examples 9 and 10 according to the invention show a significantly higher heat resistance compared with comparison example 1, with a comparable initial strength.

B) Here the higher gel content of the dispersions leads to an increase in the heat resistance, examples 4 and 8 according to the invention being distinguished from the non-conditioned comparison example 3 by a significantly better storage stability.

C) At a high gel content of the dispersions, the strength and heat resistance are adversely influenced by the poor ability of the formulations to be activated (examples 5-7).

E2: Measurement of the Initial Peel Strength and Softening Point

TABLE 3

Storage time after application of the adhesive 60 min, gluing without shock activation (method B), substrate: NORA (SBR rubber)

| | Example no. | | |
|---|---|---|---|
| | 1 | 10*) | 4*) |
| Gel content (%) | 0 | 12 | 30 |
| Initial strength (N/mm) | 2.4 | 2.5 | 1.5 |
| Soft point (° C.) | 51 | 77 | 95 |

The adhesive values on NORA rubber also confirm the dependencies found on linen (table 3).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polymer dispersion, obtained by
   a) preparing an aqueous polychloroprene dispersion with a gel content of 0.1 wt. %-30 wt. %, based on the polymer, prepared by polymerization of chloroprene in an aqueous emulsion at 10° C.-25° C. and at pH value of 10-14 and, optionally, ethylenically unsaturated monomers which can be copolymerized with chloroprene and
   b) subsequently conditioning the dispersion at temperatures of from 50° C.-110° C. until the gel content has risen by at least 10 wt. % to 1-60 wt. %, based on the polymer,
   wherein the aqueous polymer dispersion has a gel content of between 1-60 wt. % based on the polymer and a pH value of between 10-14 and wherein the aqueous dispersion does not have a significant drop in pH after storage for 7 days at 60° C.

2. Aqueous polymer dispersion according to claim 1, characterized in that the polychloroprene dispersion has a particle diameter of 60 to 120 nm.

3. The aqueous polymer dispersion according to claim 1, having a regulator content between 0 to 0.25 mmol, based on 100 g of monomer.

4. The aqueous polymer dispersion according to claim 1, wherein the dispersion has a gel content of 0.5-5 wt. % before the conditioning.

5. The aqueous polymer dispersion according to claim 1, wherein the conditioning of the dispersion takes place at 60° C. to 90° C.

6. The aqueous polymer dispersion according to claim 1, wherein after the conditioning in b) the polychloroprene dispersion has a gel content of 5 to 30 wt. %.

* * * * *